(12) United States Patent
Hamanaka et al.

(10) Patent No.: US 6,437,918 B1
(45) Date of Patent: Aug. 20, 2002

(54) METHOD OF MANUFACTURING FLAT PLATE MICROLENS AND FLAT PLATE MICROLENS

(75) Inventors: Kenjiro Hamanaka; Atsunori Matsuda; Satoshi Taniguchi; Daisuke Arai; Takashi Kishimoto; Naoto Hirayama, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/600,525
(22) PCT Filed: Jan. 23, 1998
(86) PCT No.: PCT/JP98/00264

§ 371 (c)(1),
(2), (4) Date: Oct. 17, 2000

(87) PCT Pub. No.: WO99/38035

PCT Pub. Date: Jul. 29, 1999

(51) Int. Cl.[7] .......................... G02B 27/10; G02B 3/00; G02F 1/1333; B05D 5/06
(52) U.S. Cl. .................. 359/620; 359/642; 349/57; 427/162
(58) Field of Search ................ 359/620, 742, 359/796, 797; 427/162, 164, 165, 305, 307, 372.2; 428/426, 441; 528/44, 77; 349/57, 62; 156/150, 272.2

(56) References Cited

U.S. PATENT DOCUMENTS

| | | | |
|---|---|---|---|
| 5,225,935 A | * 7/1993 | Watanabe et al. | 359/619 |
| 5,230,990 A | * 7/1993 | Iwasaki et al. | 430/321 |
| 5,513,289 A | 4/1996 | Hosokawa et al. | 385/33 |
| 5,594,008 A | 1/1997 | Nagata et al. | 528/77 |
| 5,990,992 A | * 11/1999 | Hamanaka et al. | 349/95 |
| 6,129,866 A | * 10/2000 | Hamanaka et al. | 264/1.7 |
| 2001/0012596 A1 | * 8/2001 | Kunimoto et al. | 430/128 |

FOREIGN PATENT DOCUMENTS

| | | | |
|---|---|---|---|
| EP | 0 271 839 A2 | 11/1987 | G02B/1/10 |
| EP | 0 745 621 A1 | 4/1996 | C08F/228/02 |
| EP | 0 757 262 A1 | 5/1997 | C08G/18/38 |
| FR | 2 734 828 A1 | 5/1995 | C08F/220/38 |
| JP | 1-167802 | 7/1989 | G02B/3/00 |

(List continued on next page.)

OTHER PUBLICATIONS

International Search Report PCT/ISA/210 Prepared for Application PCT/JP96/00350 (Jun. 10, 1996).

*Primary Examiner*—Georgia Epps
*Assistant Examiner*—David N. Spector
(74) *Attorney, Agent, or Firm*—Merchant & Gould, P.C.

(57) ABSTRACT

A large number of microscopic recess portions are formed on a surface of a glass substrate in a single dimension or two dimensions by conducting a wet etching through a mask. The large number of microscopic recess portions are aligned densely by again conducting the wet etching but not through the mask. A separating agent is applied upon the surface of the glass substrate and a light-curable or heat-curable resin material of high refractive index is applied thereon. The high refractive index resin material is cured, after piling a first glass substrate upon the high refractive index resin material so as to extend the high refractive index resin material thereon. The high refractive index resin material which is cured and the first glass substrate are separated from the glass substrate, and a low refractive index resin material is applied on the high refractive index resin material which is cured on the first glass substrate. The low refractive index resin material is cured, after piling a second glass substrate on the low refractive index resin material so as to extend the low refractive index resin material thereon.

12 Claims, 6 Drawing Sheets

FOREIGN PATENT DOCUMENTS

| | | | |
|---|---|---|---|
| JP | 2-42401 | 2/1990 | ............ G02B/3/00 |
| JP | 2-116809 | 5/1990 | ............ G02B/6/30 |
| JP | 3-214101 | 9/1991 | ............ G02B/3/00 |
| JP | 4-323011 | 11/1992 | ............ B29C/33/88 |
| JP | 5-228946 | 9/1993 | ............ B29C/39/10 |
| JP | 6-256459 | 9/1994 | ............ C08G/18/75 |
| JP | 6-300902 | 10/1994 | ............ G02B/3/00 |
| JP | 7-43502 | 2/1995 | ............ G02B/3/00 |
| JP | 7-225303 | 8/1995 | ............ G02B/3/00 |
| JP | 7-235075 | 9/1995 | ............ G11B/7/135 |
| JP | 8-221828 | 3/1996 | ............ G11B/11/10 |
| JP | 8-179299 | 7/1996 | ......... G02F/1/1335 |
| JP | 8-274359 | 10/1996 | ............ H01L/31/04 |
| JP | 8-134064 | 11/1996 | ............ G02B/3/00 |
| JP | 8-327986 | 12/1996 | ......... G02F/1/1335 |
| JP | 9-25321 | 1/1997 | ......... C08F/220/38 |
| JP | 9-38998 | 2/1997 | ............ B29C/39/02 |
| JP | 9-43404 | 2/1997 | ............ G02B/3/00 |
| JP | 9-43587 | 2/1997 | ......... G02F/1/1335 |
| JP | 9-68679 | 3/1997 | ............ G02C/7/02 |
| JP | 9-152510 | 6/1997 | ............ G02B/5/30 |
| JP | 9-211842 | 8/1997 | ............ G03F/1/14 |
| JP | 9-292502 | 11/1997 | ............ B29C/39/10 |
| JP | 10-39111 | 2/1998 | ............ G02B/3/00 |
| JP | 10-39112 | 2/1998 | ............ G02B/3/00 |
| JP | 0911144 A2 * | 4/1999 | ............ B29D/11/00 |
| JP | 11123771 A * | 4/1999 | ............ B29D/11/00 |
| JP | 2000098102 A * | 4/2000 | ............ G02B/3/00 |
| JP | 2001155201 A * | 6/2000 | ............ G02B/3/00 |
| JP | 2001088148 A * | 4/2001 | ............ B29C/39/26 |

* cited by examiner

METHOD OF MANUFACTURING FLAT PLATE MICROLENS AND FLAT PLATE MICROLENS

BACKGROUND OF THE INVENTION

The present invention relates to a method for manufacturing a planar micro-lens for use in a liquid crystal display element and so on, and relates to a planar micro-lens being characterized by the lens material thereof.

DESCRIPTION OF PRIOR ART

A liquid crystal display element is used in a projector television (PTV). In this liquid crystal display element, wherein a liquid crystal is put into a gap defined between two (2) pieces of glass plates, a TFT (thin film transistor) is formed from amorphous silicon and/or polysilicon, upon a surface of each of site glass plates facing to the liquid crystal, corresponding to each of pixels.

And, in the PTV using a penetrative type of liquid crystal display element therein, an illumination light is irradiated from a xenon lamp or a metal halide lamp, etc., upon the liquid crystal display element, so that it penetrate through pixel openings of the liquid crystal display element to an exit side, thereby projecting a picture or video image formed on the liquid crystal display element through a projection lens onto a screen.

For brightening the above-mentioned projection picture through collecting or condensing the above-mentioned illumination light onto the pixel openings, so as to increase the ratio of the illumination light penetrating through the liquid crystal display element, a planar micro-lens is connected or bonded on one of the two (2) pieces of glass substrates constructing the liquid crystal display element, at a side upon which the illumination light is incident, so that the illumination light is condensed onto the pixel openings, and a method for manufacturing such planar micro-lens is known, as is disclosed, for example, in Japanese Laid-Open Patent Hei 7-225303 (1995). Also, further methods are known, such as those disclosed in Japanese Laid-Open Patent Hei 2-42401 (199), Japanese Laid-Open Patent Hei 2-116809 (1990), and U.S. Pat. No. 5,513,289.

Explanation of the manufacturing method of the planar micro-lens disclosed in the Japanese Laid-Open Patent Hei 7-225303 is as below, explained with reference to to FIGS. 20(a) through (h).

First, as shown in FIG. 20(a), a light sensitive film is formed on a surface of the substrate, and an electron beam is irradiated on the light sensitive film so as to form the lens portion, as shown in FIG. 20(b), thereby producing a master disc of the micro-lens array.

Next, as shown in FIG. 20(c), upon the surface of the master disc of the micro-lens array is laminated nickel or the like through an electrocast method, and further, as shown in FIG. 20(d), the laminated body is separated or removed from the master disc of the micro-lens array, thereby producing a stamper.

Then, as shown in FIG. 20(e), an ultraviolet ray curable resin is poured into recess portions of the stamper, and as shown in FIG. 20(f), it is extended while being pushed down by a transparent substrate, and further as shown in FIG. 20(g), the ultraviolet ray curable resin is cured, and thereafter as shown in FIG. 20(h), the ultraviolet ray curable resin is separated from the stamper together with the transparent substrate.

Then, upon the surface of the separated transparent substrate, on which the lens portions are formed from the ultraviolet ray curable resin, a cover glass is fitted to be bonded on it, by pouring an adhesive resin of low refraction index to be contained between the facing surfaces thereof, thereby forming the planar micro-lens.

The lens portions are formed by means of irradiating an electron beam upon a resist in the above-mentioned method, however it is difficult to form a microscopic lens by this method with high precision or accuracy.

Also, for the planar micro-lens to be installed within a liquid crystal display device, it is desirable to be of a dense type, in which a large number of the lens portions are aligned closely without gaps between them in the plane view thereof, however it is difficult to produce such the dense micro-lens array through such a conventional manufacturing method as that mentioned above.

Further, for manufacturing the liquid crystal display device, it is also necessary to form elements or components such as transparent electrodes, an orientation film, a black matrix, etc., on a surface of the above-mentioned cover glass facing to the liquid crystal. Since the steps for the forming of those elements must be conducted under heating, it is therefore determined that resin materials forming the lens and the adhesive layers should not be such ones that may be subject to thermal cracking and/or thermal deformation and decreases of transparency thereof, and in the Japanese Laid-Open Patent Hei 7-225303 (1995) are listed various materials being commercially available for use as resins heat-resistant against temperatures of 150° C. or more. However, in actual practice, by taking the temperature for forming the transparent electrodes and the orientation film with a spattering method, etc., into consideration, heat-resistance against 150° C. or more is not great enough resistance, since there can be easily caused a change of color (i.e., transparent material changed in color to yellow), separation, cracks, dimness, etc., therefore at least a heat-resistance to temperatures of 180° C. or more is required for the resin material having high refraction index, which is used as the lens portion in particular.

DISCLOSURE OF THE INVENTION

In accordance with the present invention, for dissolving such problems of the conventional arts as those mentioned above, a first object is to provide a method for manufacturing a planar micro-lens, with which microscopic lens portions can be formed on the surface of a glass substrate with high precision or accuracy, and a second object is to provide a planar micro-lens having a superior hear-resistance thereof.

For achieving the first object, according to the present invention, there are provided methods relating to the present claims 1 through 3, assuming that each of them is based upon a method for manufacturing a planar micro-lens, having a high refractive index resin material and a low refractive index resin material, being laminated in layers within a region defined between a first glass substrate and a second glass substrate, wherein microscopic spherical surfaces or microscopic cylindrical surfaces are aligned on a boundary surface of the two kinds of the resin materials in a single dimension or two dimensions, wherein the method for manufacturing a planar micro-lens defined in claim 1 comprises the following first through sixth steps:

(First step)
  a step for forming a large number of microscopic recess portions forming cylindrical or spherical surfaces on a surface of a glass substrate in a single dimension or two dimensions, by conducting a wet etching through a mask upon the surface of the glass substrate as a forming die;

(Second step)
a step for aligning the large number of the microscopic recess portions densely, by again conducting the wet etching upon the surface of the glass substrate as the forming die on which the microscopic recess portions are formed in the first step, but not through the mask;

(Third step)
a step for applying a separating agent upon the surface of the glass substrate as the forming die having the microscopic recess portions aligned densely being formed in the second step, and further for applying a light-curable or heat-curable resin material of high refractive index thereon;

(Fourth step)
a step for curing the high refractive index resin material, after piling a first glass substrate upon the high refractive index resin material which is applied to the glass substrate as the forming die in the third step, so as to cause the high refractive index resin material to extend on the surface thereof;

(Fifth step)
a step for separating the high refractive index resin material which is cured in the fourth step and the first glass substrate from the glass substrate as the forming die, and for applying a low refractive index resin material on the high refractive index resin material which is cured on the first glass substrate; and (Sixth step)
a step for curing the low refractive index resin material, after piling a second glass substrate on the low refractive index resin material which is applied to the high refractive index resin material in the fifth step so as so cause the low refractive index resin material to extend on the surface thereof.

Also, the method for manufacturing a planar micro-lens, defined in claim 2, comprises the following first through seventh steps:

(First step)
a step for forming a large number of microscopic recess portions forming cylindrical or spherical surfaces on a surface of a glass substrate in a single dimension or two dimensions, by conducting a wet etching through a mask upon the surface of the glass substrate as a forming die;

(Second step)
a step for aligning the large number of the microscopic recess portions densely, by again conducting the wet etching upon the surface of the glass substrate as the forming die on which the microscopic recess portions are formed in the first step, but not through the mask;

(Third step)
a step for transferring a surface configuration of the glass substrate as the forming die, upon which the large number of the microscopic recess portions are formed densely in the second step, onto a reverse forming die made of nickel and so on;

(Fourth step)
a step for applying a separating agent upon the surface of the reverse forming die being formed in the third step, and further for applying thereon a light-curable or heat-curable resin material of low refractive index;

(Fifth step)
a step for curing the low refractive index resin material, after piling a second glass substrate upon the low refractive index resin material which is applied to in the fourth step so as to cause the low refractive index resin material so extend on the surface thereof;

(Sixth step)
a step for separating the low refractive index resin material which is cured in the fifth step and the second glass substrate from the reverse forming die, and for applying a high refractive index resin material on the low refractive index resin material which is cured on the second glass substrate; and (Seventh step)
a step for curing the high refractive index resin material, after piling a first glass substrate on the high refractive index resin material which is applied to the low refractive index resin material in the sixth step so at to cause the high refractive index resin material to extend on the surface thereof.

Further, the method for manufacturing a planar micro-lens, defined in claim 3, comprises the following first through eighth steps:

(First step)
a step for forming a large number of microscopic recess portions forming cylindrical or spherical surfaces on a surface of a glass substrate in a single dimension or two dimensions, by conducting a wet etching through a mask upon the surface of the glass substrate as a forming die;

(Second step)
a step for aligning the microscopic recess portions densely, by again conducting the wet etching upon the surface of the glass substrate as the forming die on which the large number of the microscopic recess portions are formed in the first step, but not through the mask;

(Third step)
a step for transferring a surface configuration of the glass substrate as the forming die, upon which the large number of the microscopic recess portions are formed densely in the second step, onto a first reverse forming die made of nickel and so on;

(Fourth step)
a step for transferring a surface configuration of the first reverse forming die, which is produced in the third step, onto a second reverse forming die made of nickel and so on;

(Fifth step)
a step for applying a separating agent upon the surface of the second reverse die being formed in the fourth step, and further for applying thereon a light-curable or heat-curable resin material of high refractive index;

(Sixth step)
a step for curing the high refractive index resin material, after piling a first glass substrate upon the high refractive index resin material which is applied to in the fifth step so as to cause the high refractive index resin material to extend on the surface thereof;

(Seventh step)
a step for separating the high refractive index resin material which is cured in the sixth step and the first glass substrate from the second reverse forming die, and for applying a low refractive index resin material on the high refractive index resin material which is cured on the first glass substrate; and (Eighth step)
a step for curing the low refractive index resin material, after piling a second glass substrate on the low refractive index resin material which is applied to the high refractive index resin material in the seventh step so at to cause the low refractive index resin material to extend on the surface thereof.

For achieving the second object of the present invention, as defined in the present claims 4 through 12, provided is a planar micro-lens having a high refractive index resin material and a low refractive index resin material, being laminated in layers within a region defined between two (2) pieces of glass substrates, wherein microscopic cylindrical surfaces or microscopic spherical surfaces are aligned on a boundary surface of the two kinds of resin material in a single dimension or two dimensions, and said high refractive index resin material is comprised of a resin having thiol bonding (R—S—H) or a resin having sulfide bonding (R—S—R'), or a resin being expressed by a general equation, (R'—S—R—S—R—S—R'), as a main ingredient, where S is sulfur, H hydrogen, R any one of cyclic unsaturated hydrocarbon, cyclic saturated hydrocarbon, straight chain-like unsaturated hydrocarbon and straight chain-like saturated hydrocarbon, and R' any one of organic compounds having acryloyl group, methacryloyl group, epoxy group, isocyanate group, amino group, acyl group, carboxyl group, alkoxylil group, vinyl group.

The main ingredient which forms said high refractive index resin material is properly a polymer, obtained from monomers indicated by the following structural formulae as starting materials thereof;

Formula 1

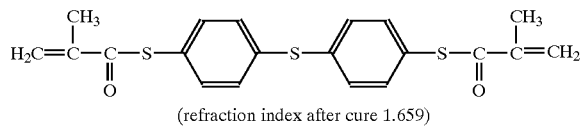

bis [4-(2,3-epoxypropylthio)phenyl]sulfide

Formula 2

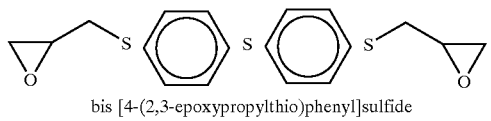

(refraction index after cure 1.659)

Formula 3

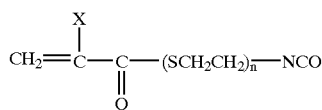

(X indicates hydrogen or methyl group, and n an integer from 0 to 2)

Formula 4

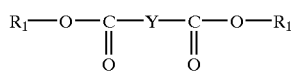

where in the formula, $R_1$ indicates

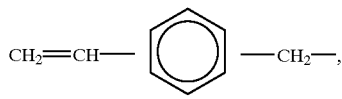

$CH_2=CHCOOCH_2CH_2$— or $CH_2=C(CH_3)COOCH_2CH_2$— and Y—$R_2$—S—$R_2$— or —$R_2$—S—($R_2Z$)$_m$$R_2$—S—$R_2$— (however, $R_2$ indicates alkylene group, while Z oxygen atom or sulfur atom. Also, m indicates an integer from 0 to 3)

Formula 5

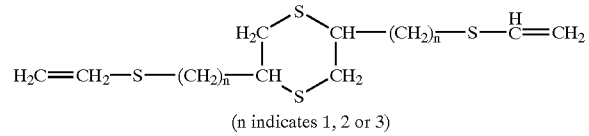

(n indicates 1, 2 or 3)

Formula 6

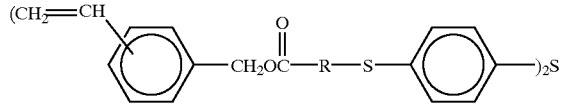

(in the formula, R indicates —$CH_2$—, —$CH_2CH_2$—, or —$CH(CH_3)CH_2$—)

Formula 7

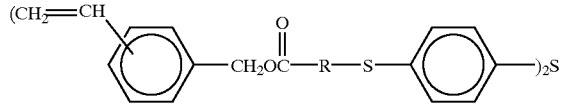

Formula 8

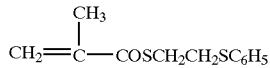

Formula 9

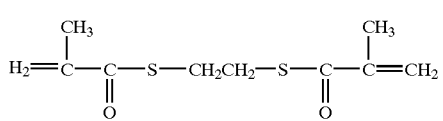

Also, the low refractive index resin material which is laminated with the high refractive index resin material is properly any one of resins of fluorine group, resins of acryl group, and resins of epoxy group.

Also, any one of boundary surfaces between said glass substrate and the high refractive index resin material, between the glass substrate and the low refractive index resin material, and between the high refractive index resin material and the low refractive index resin material, is coupled through a coupling agent, thereby increasing the bonding power therebetween, as well as effectively preventing any change in color (i.e.: yellow coloring) due to invasion of oxygen into the boundary surfaces. Further, the coupling agent can be comprised of γ-glycidepropyl-trimethoxysilane or γ-mercaptpropyl-trimethoxysilane.

Also, it is possible to make the high refractive index resin material contain a curing agent of the thiol group. If it contains the curing agent of the thiol group, because an oxide in the main agent is reduced by the thiol, because an impurity which ought to be oxidized and colored is reduced due to the existence of the thiol, and further because it cannot take on a coloring resonant structure due to addition of the thiol, it is possible to prevent coloration of the high refractive index resin material. The curing agent of the thiol group may comprise, for example, pentaerithritol-tetrakisthiopropionate indicated by the following equation (formula 10), or trihydroxyethyl-isocyanate β mercaptpropionic acid, as indicated by the following equation (formula 11):

Formula 10

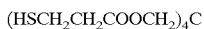

Formula 11

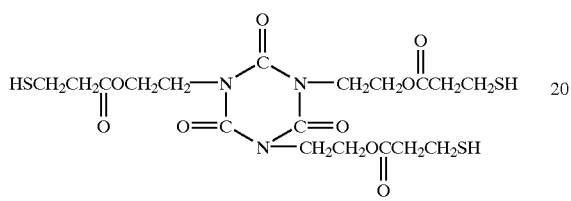

Further, it is possible to make the high refractive index resin material contain a curing promotion agent other than the curing agent of the thiol group. The curing promotion agent may comprise, for example, dibutyltin-dilaurate, as indicated by the following formula 12:

Formula 12

Also, as the glass substrate used in constructing the planar micro-lens, though its type is not particularly restricted, employed may be one made from a quartz glass, a low expansive crystal glass, or a borosilicate glass.

As the low expansive crystal glass can be used "Neoceram (®)" by Nippon Denki Glass Co., Ltd., ($66SiO_2 22Al_2O_3 4LiO_2 2ZrO_2 2TiO_2$) or "Vycor" by Corning Inc., ($96SiO_2 3B_2O_3 1Al_2O_3$).

Further, as examples of the composition of the borosilicate glass, the following are preferable:

(Composition 1)
  $SiO_2$: equal to or greater than 45 mass % and equal to or less than 75 mass %;
  $B_2O_3$: equal to or greater than 8.0 mass % and equal to or less than 19.0 mass %;
  BaO: equal to or greater than 4.2 mass % and equal to or less than 14 mass %;
  MO (M being a metal of 2-valence other than Ba): equal to or greater than 10 mass % and equal to or less than 30 mass %;
  $R_2O$ (R being a metal of 1-valence): equal to or less than 10 mass %;

(Composition 2)
  $SiO_2$: equal to or greater than 45 mass % and equal to or less than 75 mass %;
  $B_2O_3$: equal to or greater than 9.5 mass % and equal to or less than 12.5 mass %;
  BaO: equal to or greater than 4.2 mass % and equal to or less than 14 mass %;
  MO (M being a metal of 2-valence other than Ba): equal to or greater than 10 mass % and equal to or less than 30 mass %;
  $R_2O$ (R being a metal of 1-valence): equal to or less than 10 mass %;

(Composition 3)
  $SiO_2$: equal to or greater than 45 mass % and equal to or less than 75 mass %;
  $B_2O_3$: equal to or greater than 8.0 mass % and equal to or less than 19.0 mass
  BaO: equal to or greater than 4.2 mass % and equal to or less than 14 mass %;
  MO (M being a metal of 2-valence other than Ba): equal to or greater than 10 mass % and equal to or lets than 30 mass %;
  $R_2O$ (R being a metal of 1-valence): equal to or less than 1 mass %;

(Composition 4)
  $SiO_2$: equal to or greater than 45 mass % and equal to or less than 75 mass %;
  $B_2O_3$: equal to or greater than 8.0 mass % and equal to or less than 19.0 mass %;
  BaO: equal to or greater than 4.2 mass % and equal to or less than 10 mass %;
  MO (M being a metal of 2-valence other than Ba): equal to or greater than 10 mass % and equal to or less than 30 mass %;
  $R_2O$ (R being a metal of 1-valence): equal to or less than 10 mass %;

Figure 1:
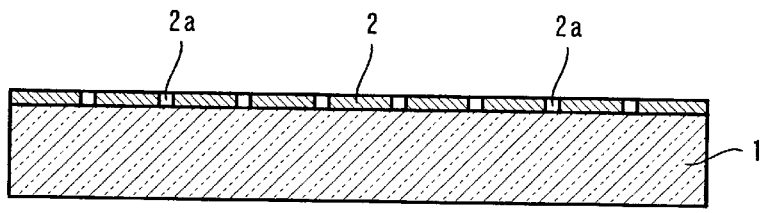
FIG. 1 is a view showing a step in the manufacture of a planar micro-lens according to the present invention.

In the above figures, reference numeral 1 indicates a glass substrate to be a forming die, 2 indicates a mask, 3 indicates recess portions, 4 indicates a layer of a separating agent, 5 indicates a high refractive index resin material, 6 indicates a first glass substrate, 7 indicates a low refractive index resin material, 8 indicates a second glass substrate, 11 indicates a reverse forming die (a first reverse forming die), and 12 indicates a second reverse forming die.

BEST MODE FOR CARRYING OUT THE INVENTION

Hereinafter, embodiments according to the present invention will be fully explained with reference to the attached drawings. Herein, FIGS. 1 through 9 are views showing steps of the manufacture of a planar micro-lens according to the present invention wherein, according to the present invention, as first shown in FIG. 1, upon the surface of a glass substrate 1 to be a forming die is piled up a mask 2, on which a large number of small bores 2a are formed, and next the surface thereof being covered with the mask 2 is dipped into an etchant of HF (hydrogen fluoride) in order to conduct wet etching thereon.

Figure 2:
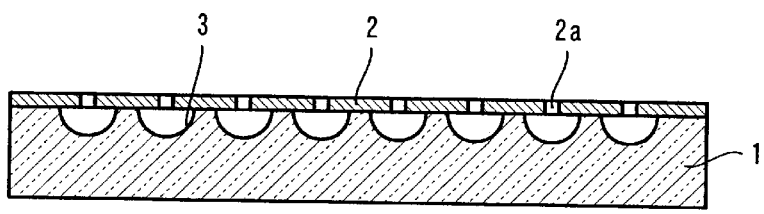
FIG. 2 is a view showing a step in the manufacture of the same planar micro-lens.
Figure 3:
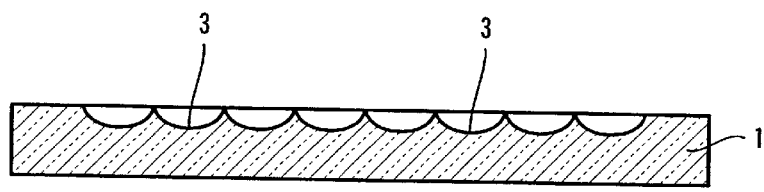
FIG. 3(a) is a view showing a step in the manufacture of the same planar micro-lens.
FIG. 3(b) is a plane view of FIG. 3(a)
Figure 3:
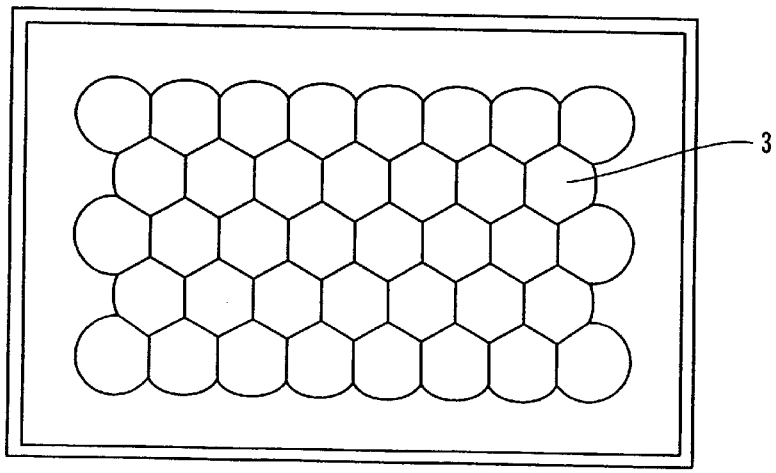

Since the wet etching exhibits a pattern of isotropic etching, as shown in FIG. 2, recess portions 3 of roughly hemispherical shape are formed in single or one (1) dimensional or two (2) dimensional manner, on portions corresponding to the small bores 2a. However, the recess portions 3 may be gutters of semicircular shape in the cross-section thereof. In this instance, lenticular lenses are formed therein.

Next, the mask 2 is removed, and the surface on which the recess portions 3 are formed is treated, again, with wet etching. With this etching, as shown in FIG. 3(a), the glass substrate 1 to be the forming die comes to be thin in the thickness thereof, and the surface thereof, including the recess portions thereon, is etched, equally or uniformly, therefore the recess portion of the hemispherical shape comes to be flattened or compressed in form, and as shown from a plane view point thereof in FIG. 3(b), the recess portions are closely formed or aligned with no gap therebetween.

Though in FIG. 3(b) is shown a condition that the recess portions 3 are formed closely in a honeycomb-like (hexagonal) shape, they may be formed closely in a quadrilateral-like shape depending upon the arrangement thereof.

Figure 4:
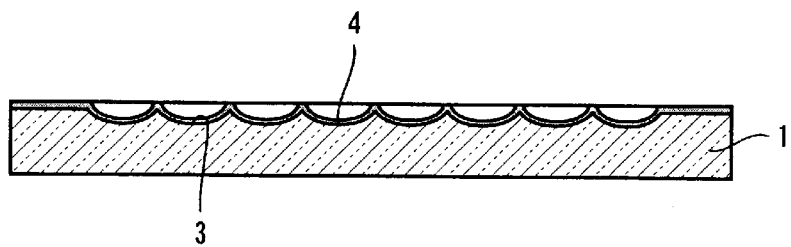
FIG. 4 is a view showing a step in the manufacture of the same planar micro-lens.

Upon the surface of the glass substrate 1 on which the recess portions are arranged through the above-mentioned etching, as shown in FIG. 4, a layer 4 of a separating of materials of fluorine group or silicon group is formed. In a method for forming the separating agent layer 4, the material thereof is baked after it is applied onto the surface of the glass substrate 1 through, for example, a spin-coating method, a dipping method, a method of adsorbing the material evaporated onto the surface of the glass substrate, or a method of adsorbing the material onto the surface by dipping into a solution of the material, etc.

Figure 5:
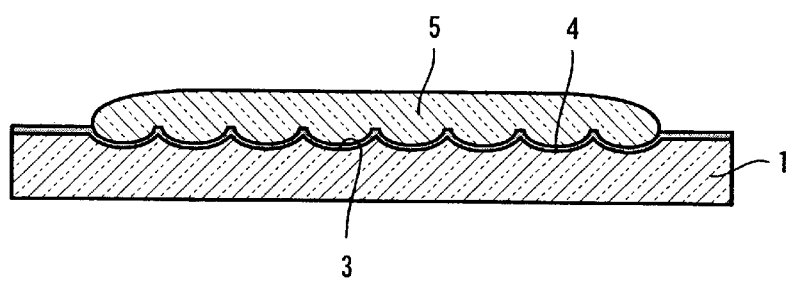
FIG. 5 is a view showing a step in the manufacture of the same planar micro-lens.
Figure 6:
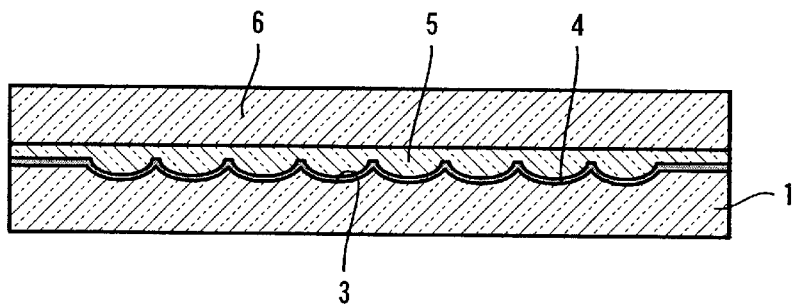
FIG. 6 is a view showing a step in the manufacture of the same planer micro-lens.

After this, as shown in FIG. 5, upon the surface on which is formed the separating agent layer 4 is applied a light-curable or heat-curable high refractive index resin material 5, and further as shown in FIG. 6, a first glass substrate 6 is pushed down on the high refractive index resin material 5, thereby expanding or spreading the high refractive index resin material 5 thereon. Herein, it is preferable to form a film of a coupling agent on the surface of the first glass substrate 6, facing to the high refractive index resin material 5, or to remove any residue of the separating agent, which will be shifted a little bit on the surface of the high refractive index resin material 5, when separating, by rinsing it away with a solvent.

Figure 7:
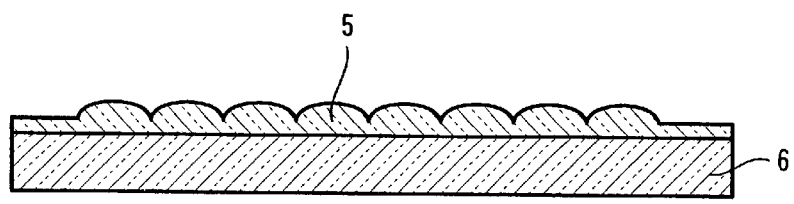
FIG. 7 is a view showing a step in the manufacture of the same planar micro-lens.

In the manner as mentioned above, under the condition that the first glass substrate 6 is layered over the high refractive index resin material 5, the high refractive index resin material 5 is cured by an irradiation of ultraviolet rays or by heating, then the first glass substrate 6 and the high refractive index resin material 5 cured in convex lens-like forms are separated from the glass substrate 1 as shown in FIG. 7.

Figure 8:
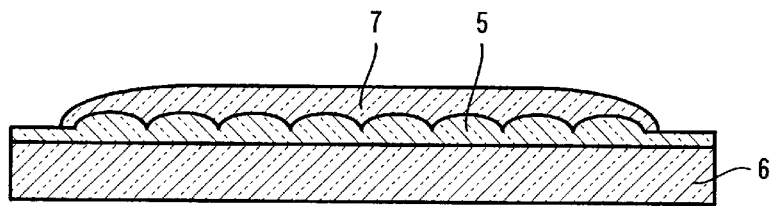
FIG. 8 is a view showing a step in the manufacture of the same planar micro-lens.

Next, as shown in FIG. 8, a light-curable or heat-curable low refractive index resin material 7 is applied upon the high refractive index resin material 5 being cured in the convex lens-like forms. This low refractive index resin material 7 has a function as an adhesive.

Figure 9:
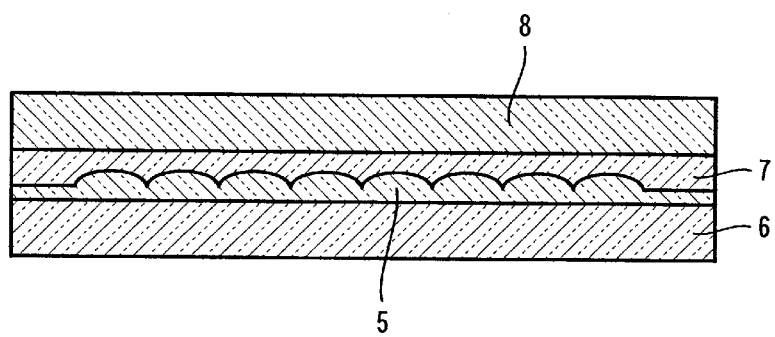
FIG. 9 is a cross-sectional view of the planar micro-lens according to the present invention.

And further, as shown in FIG. 9, after pressing a second glass substrate 8 on the low refractive index resin material 7, thereby spreading it thereon, the low refractive index resin material 7 is cured, and finally the first glass substrate 6 and the second substrate 8 are ground or polished to be of a predetermined thickness depending upon the necessity thereof, thereby completing the planar micro-lenses.

It is preferable that a film of the coupling agent is formed on the boundary surface between the high refractive index resin material 5 and the low refractive index resin material 7, and/or between the low refractive index resin material 7 and the second glass substrate 8.

FIGS. 10 to 14 are views showing the manufacturing steps of the planar micro-lens according to a second embodiment, and in the second embodiment, since the steps leading up to the formation of the recess portions, formed closely on the surface of the glass substrate 1, are same as those in the first embodiment, a second recitation of these steps is therefore omitted.

Figure 10:
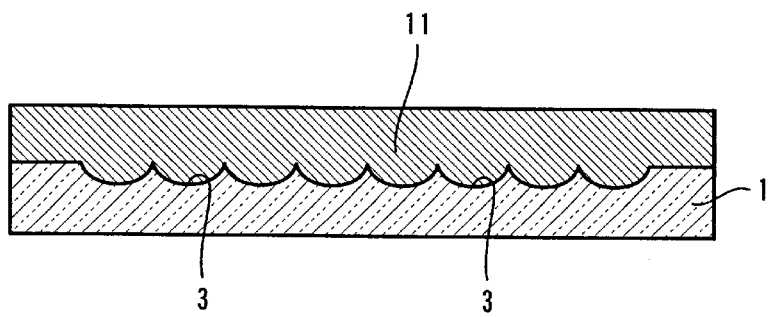
FIG. 10 is a view showing another embodiment of a step in the manufacture of a planar micro-lent according to the present invention.

In the second embodiment, as shown in FIG. 10, the surface configuration of the glass substrate 1, on which the recess portions are arranged closely, is copied or transferred onto a reverse forming die 11 of nickel or the like, through an electric casting, etc., and then the same coating of the separating agent is applied thereon as in the first embodiment.

Figure 11:
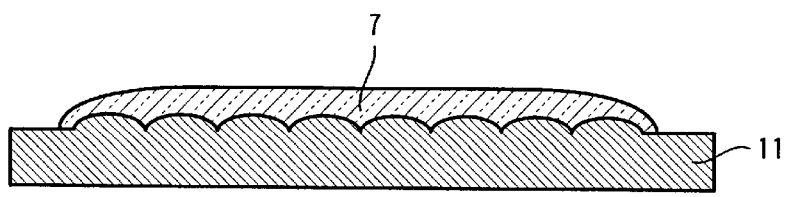
FIG. 11 is a view showing another embodiment of a step in the manufacture of the same planar micro-lens according to the present invention.
Figure 12:
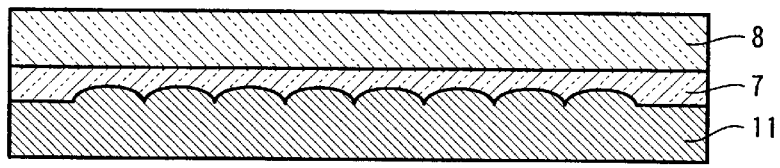
FIG. 12 is a view showing another embodiment of a step in the manufacture of the same planar micro-lens according to the present invention.
Figure 13:
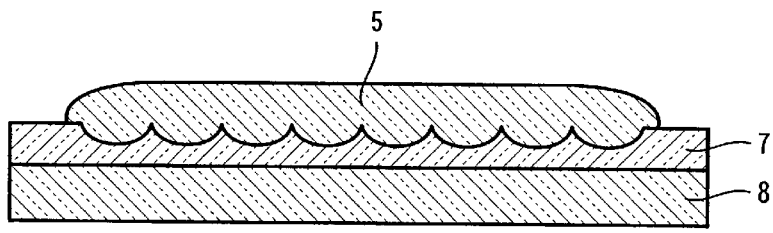
FIG. 13 is a view showing another embodiment of a step in the manufacture of the same planar micro-lens according to the present invention.
Figure 14:
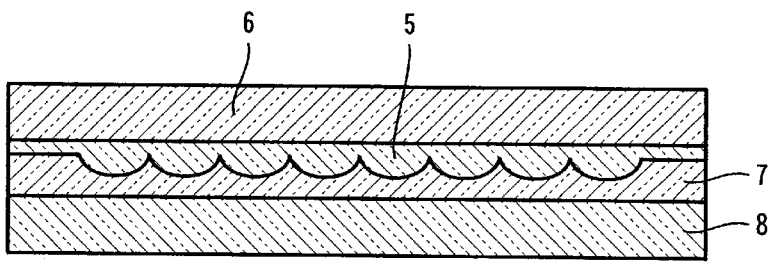
FIG. 14 is a view showing another embodiment of a step in the manufacture of the same planar micro-lens according to the present invention.

Next, as shown in FIG. 11, upon the reverse forming die 11 is applied a light-curable or heat-curable low refractive index resin material 7, and further, as shown in FIG. 12, after a second glass substrate 8 is layered thereon so as to spread resin 7 thereby, the low refractive index resin material 7 is cured. Next, the cured low refractive index resin material 7 and the second glass substrate 8 are separated from the reverse forming die 11, and as shows in FIG. 13, a high refractive index resin material 5 is applied onto the cured low refractive index resin material 7. Further, as shown in FIG. 14, after the first glass substrate 6 is layered thereon, so as to spread resin 5 thereby, the high refractive index resin material 5 may be cured.

FIGS. 15 to 19 see views showing the manufacturing steps of the planar micro-lens according to a third embodiment, and also in the third embodiment, since the steps leading up to the formation of the recess portions, formed closely on the surface of the glass substrate 1, are same as those in the first embodiment, a further recitation of these steps is omitted.

Figure 15:
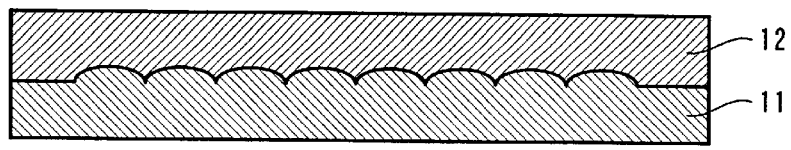
FIG. 15 is a view showing another embodiment of a step in the manufacture of the same planar micro-lens according to the present invention.
Figure 16:
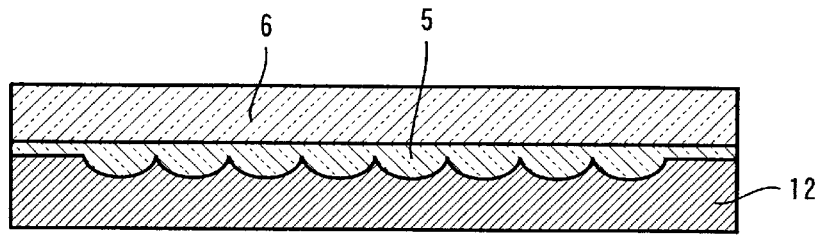
FIG. 16 is a view showing another embodiment of a step in the manufacture of the same planar micro-lens according to the present invention.
Figure 17:
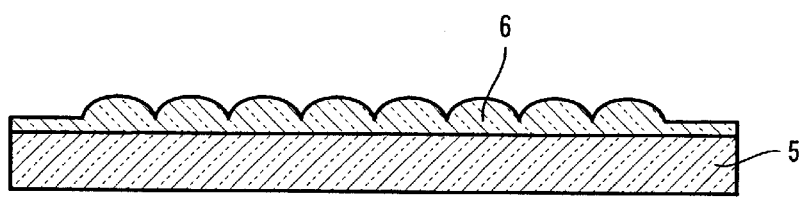
FIG. 17 is a view showing another embodiment of a step in the manufacture of the same planar micro-lens according to the present invention.
Figure 18:
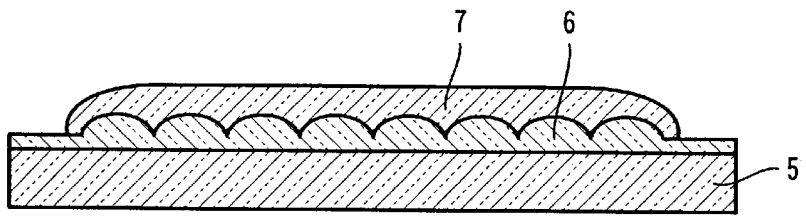
FIG. 18 is a view showing another embodiment of a step in the manufacture of the same planar micro-lens according to the present invention.
Figure 19:
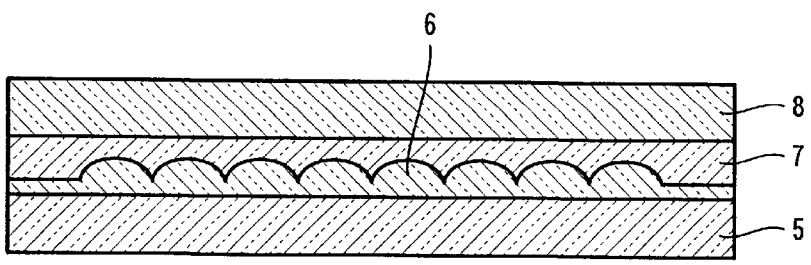
FIG. 19 is a view showing another embodiment of a step in the manufacture of the same planar micro-less according to the present invention.
Figure 20A:
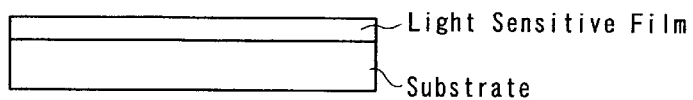
FIGS. 20(a) to (h) are views showing steps in the manufacture of a conventional planar micro-lens.
Figure 20B:
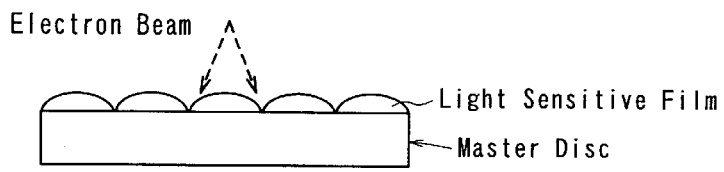
Figure 20C:
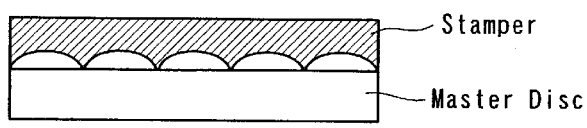
Figure 20D:
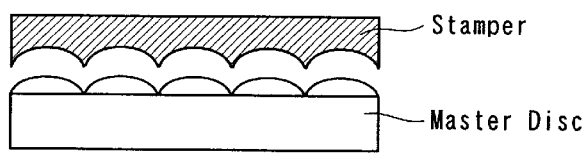
Figure 20E:
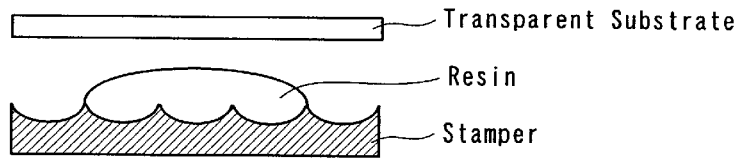
Figure 20F:
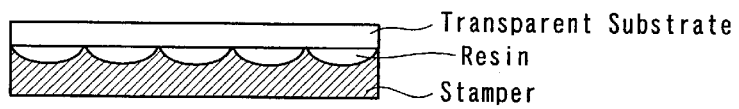
Figure 20G:
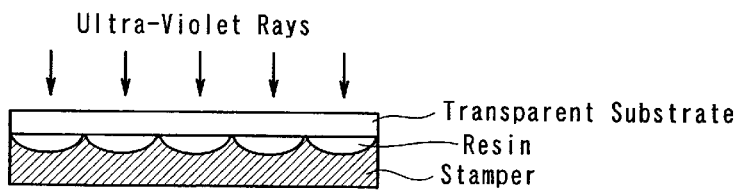
Figure 20H:
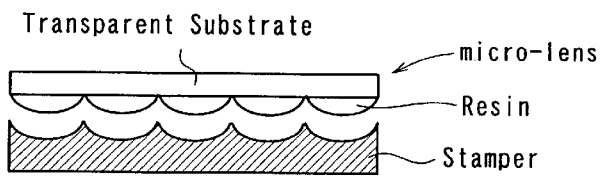

In the third embodiment, the surface configuration of the reverse forming die 11 of nickel or the like is copied or transferred onto a second reverse forming die 12 of nickel or the like, as shown in FIG. 15, and the coating of the separating agent is applied, in the same manner as in the first embodiment. Next, on this second reverse forming die 12 is applied the light-curable or heat-curable high refractive index resin material 5, and then as shown in FIG. 16, the first glass substrate 6 is layered on the high refractive index resin material 5. After being extended thereby, the high refractive index resin material 5 is cured, then the first glass substrate 6 and the high refractive index resin material 5 cured in the convex lens-like shape are separated from the second reverse forming die 12 as shown in FIG. 17, and next as shown in FIG. 18, the light-curable or heat-curable low refractive resin material 7 is applied on the high refractive index resin material 5 cured in the convex lens-like shape. Further, as shown in FIG. 19, the second glass substrate 5 is pushed down on the low refractive index resin material 7 so as to extend it thereon, and thereafter it is cured.

As was explained in the above, with the manufacturing method of the planar micro-lens according to the present invention, it is possible to manufacture the micro-lens array in which the lens portions are arranged closely without gaps between them, in the plane view thereof.

Further, taking the steps for manufacturing the liquid crystal display device into consideration, it is necessary to use the special high refractive index resin material and the low refractive index resin material both being durable enough to withstand processing at a high temperature of about 180° C. However, in general, such resins' separation qualities are poor. Because of this, they sometimes cannot be separated from the die, or the die is damaged when they are separated from them, therefore it is impossible to achieve good or qualified forming. However, according to the present invention, since the separating agent is applied on the forming die, the resins can be separated easily from the forming die, with no damage occurring to the forming die.

Also, those micro-lenses are formed in the concave-convex shape, being very minute or microscopic in the sizes thereof, such as from 10 $\mu$m to several tens of $\mu$m, however since it is possible to form a film of the separating agent with an uniform thickness at a sub-micron scale, by applying the separating agent with an appropriate concentration thereof, therefore it is possible to faithfully copy or transfer the minute concave-convex configuration of a master disc to be produced with precision, accuracy and correctness, through the glass etching.

In particular, the separating agent of the fluorine group can be dissolved into an organic solvent, such as isobutane, etc. This separating agent is convenient since it can be applied repeatedly, after rinsing away the previous application of the separating agent from the surface of the forming die, in particular in a case where the separation property thereof is decreased because a part of the separating agent film thereof is exfoliated or removed after repetitive using of the forming die.

Also, effects of the invention described in claim 1 can be listed including that the step of transferring onto the Ni stamper is not necessitated, that there is no probability of change in the shape or damage to the stamper in the step of manufacturing the stamper, and further that the glass master disc is cheaper than the Ni stamper.

Also, as an effect inherent to the invention described in claim 2, though many of the high refractive index resin materials shown in the present application are heat-curable resins, but ones being light-curable are difficult to obtain, it is very effective to use the reverse forming die made of Ni, etc., as described in claim 2, to overcome these challenges.

Further, as an effect inherent to the invention described in claim 3, since there are some resins which show large resistance when they are separated even with use of the separating agent, the minute concave-convex formation of glass can be broken or damaged slightly when the resin is separated from the forming die, dependent upon the resin, however by using the stamper which is same as the glass master disc in a male and female relation, it is possible to suppress the breakage of the stamper.

Also, with the planar micro-lens according to the present invention, in the planar micro-lens thereof, having a high refractive index resin material and a low refractive index resin material, being laminated in layers within a region defined between two (2) pieces of glass substrates, in which microscopic cylindrical surfaces or microscopic spherical surfaces are aligned on a boundary surface of the two kinds of resin materials in a single dimension or two dimensions, by using the proposed, specific high refractive index resin materials, it is possible to prevent the lens portions from being subject to deformation or deterioration thereof even when they are exposed under the high temperature of 180° C. or more, thereby obtaining the planar micro-lens while preserving a certain transparency thereof.

INDUSTRIAL APPLICABILITY

With the method for manufacturing the planar micro-lens and the planar microlens, according to the present invention, it is possible to provide components for a liquid crystal display element to be utilized in a projection television (PTV).

What is claimed is:

1. A method for manufacturing a planar micro-lens, having a high refractive index resin material and a low refractive index resin material, being laminated in layers within a region defined between a first glass substrate and a second glass substrate, wherein microscopic cylindrical surfaces or microscopic spherical surfaces are aligned on a boundary surface of the high refractive index resin material and the low refractive index resin material in a single dimension or two dimensions, said method comprising the following first through sixth steps:

(First step)
a step for forming a large number of microscopic recess portions forming cylindrical or spherical surfaces on a surface of a glass substrate in a single dimension or two dimensions, by conducting a wet etching through a mask upon the surface of the glass substrate as a forming die;

(Second step)
a step for aligning the large number of the microscopic recess portions densely, by again conducting the wet etching upon the surface of the glass substrate as the forming die on which die microscopic recess portions are formed in the first step, but not through the mask;

(Third step)
　a step for applying a separating agent upon the surface of the glass substrate as the forming die having the microscopic recess portions aligned densely, being formed in the second step, and further for applying a light-curable or heat-curable resin material of high refractive index thereon;

(Fourth step)
　a step for curing the high refractive index resin material, after piling a first glass substrate upon the high refractive index resin material which is applied to the glass substrate as the forming die in the third step so as to cause the high refractive index resin material to extend on the surface thereof;

(Fifth step)
　a step for separating the high refractive index resin material which is cured in the fourth step and the first glass substrate from the glass substrate as the forming die, and for applying a low refractive index resin material on the high refractive index resin material which is cured on the first glass substrate; and (Sixth step)
　a step for curing the low refractive index resin material, after piling a second glass substrate on the low refractive index resin material which is applied to the high refractive index resin material in the fifth step so as to cause the low refractive index resin material to extend on the surface thereof.

2. A method for manufacturing a planar micro-lens, having a high refractive index resin material and a low refractive index resin material, being laminated in layers within a region defined between a first glass substrate and a second glass substrate, wherein a large number of microscopic cylindrical surfaces or microscopic spherical surfaces are aligned on a boundary surface of the two kinds of the resin materials in a single dimension or two dimensions, said method comprising the following first through seventh steps:

(First step)
　a step for forming a large number of microscopic recess portions forming cylindrical or spherical surfaces on a surface of a glass substrate in a single dimension or two dimensions, by conducting a wet etching through a mask upon the surface of the glass substrate as a forming die;

(Second step)
　a step for aligning the large number of the microscopic recess portions densely, by again conducting the wet etching upon the surface of the glass substrate as the forming die on which the microscopic recess portions are formed in the first step, but not through the mask;

(Third step)
　a step for transferring a surface configuration of the glass substrate as the forming die upon which the large number of the microscopic recess portions are formed densely in the second step, onto a reverse forming die made of nickel or the like;

(Fourth step)
　a step for applying a separating agent upon the surface of the reverse forming die being formed in the third step, and further for applying thereon a light-curable or heat-curable resin material of low refractive index;

(Fifth step)
　a step for curing the low refractive index resin material, after piling a second glass substrate upon the low refractive index resin material which is applied to the reverse forming die in the fourth step so as to cause the low refractive index resin material to extend on the surface thereof;

(Sixth step)
　a step for separating the low refractive index resin material which is cured in the fifth step and the second glass substrate from the reverse forming die, and for applying a high refractive index resin material on the low refractive index resin material which is cured on the second glass substrate; and (Seventh step)
　a step for curing the high refractive index resin material, after piling a first glass substrate on the high refractive index resin material which is applied to the low refractive index resin material in the sixth step so as to cause the high refractive index resin material to extend on the surface thereof.

3. A method for manufacturing a planar micro-lens, having a high refractive index resin material and a low refractive index resin material, being laminated in layers within a region defined between a first glass substrate and a second glass substrate, wherein a large number of microscopic cylindrical surfaces or microscopic spherical surfaces are aligned on a boundary surface of the two kinds of the resin materials in a single dimension or two dimensions, said method comprising the following first through eighth steps:

(First step)
　a step for forming a large number of microscopic recess portions forming cylindrical or spherical surfaces on a surface of a glass substrate in a single dimension or two dimensions, by conducting a wet etching through a mask upon the surface of the glass substrate as a forming die;

(Second step)
　a step for aligning the microscopic recess portions densely, by again conducting the wet etching upon the surface of the glass substrate as the forming die on which the large number of the microscopic recess portions are formed in the first step, but not through the mask;

(Third step)
　a step for transferring a surface configuration of the glass substrate as the forming die upon which the large number of the microscopic recess portions are formed densely in the second step, onto a first reverse forming die made of nickel or the like;

(Fourth step)
　a step for transferring a surface configuration of the first reverse forming die, which is produced in the third step, onto a second reverse forming die;

(Fifth step)
　a step for applying a separating agent upon the surface of the second reverse forming die being formed in the fourth step, and further for applying thereon a light-curable or heat-curable resin material of high refractive index;

(Sixth step)
　a step for curing the high refractive index resin material, after piling a first glass substrate upon the high refractive index resin material which is applied to the second reverse forming die in the fifth step so as to cause the high refractive index resin material to extend on the surface thereof;

(Seventh step)
　a step for separating the high refractive index resin material which is cured in the sixth step and the first glass substrate from the second reverse forming die, and for applying a low refractive index resin material on the high refractive index resin material which is cured on the first glass substrate; and (Eighth step)
a step for curing the low refractive index resin material, after piling a second glass substrate on the low refractive index resin material which is applied to the high refractive index resin material in the seventh step so as to cause the low refractive index resin material to extend on the surface thereof.

4. A planar micro-lens, having a high refractive index resin material and a low refractive index resin material being laminated in layers within a region defined between two (2) pieces of glass substrates, wherein microscopic cylindrical surfaces or microscopic spherical surfaces are aligned on a boundary surface of the two kinds of the resin materials in a single dimension or two dimensions, and said high refractive index resin material is comprised of a resin having thiol bonding (R—S—H) or a resin having sulfide bonding (R—S—R'), or a resin being expressed by a general equation, (R'—S—R—S—R—S—R'), where S is sulfur, H hydrogen, R any one of cyclic unsaturated hydrocarbon, cyclic saturated hydrocarbon, straight chain-like unsaturated hydrocarbon and straight chain-like saturated hydrocarbon, and R' any one of organic compounds having acryloyl group, methacryloyl group, epoxy group, isocyanate group, amino group, acyl group, carboxyl group, alkoxylil group, vinyl group.

5. A planar micro-lens as defined is claim 4, wherein the main ingredient which forms said high refractive index resin material is a polymer obtained from the monomers indicated by the following structural formulas as starting materials thereof:

Formula 1

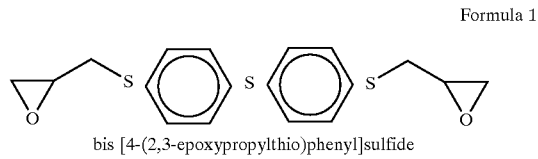

bis [4-(2,3-epoxypropylthio)phenyl]sulfide

Formula 2

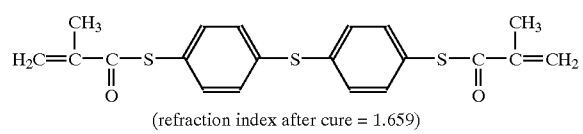

(refraction index after cure = 1.659)

Formula 3

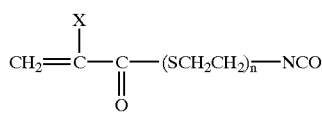

(X indicates hydrogen or methyl group, and n an integer from 0 to 2)

Formula 4

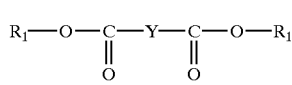

where in the formula, R, indicates

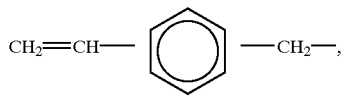

$CH_2=CHCOOCH_2CH_2—$ or $CH_2=C(CH_3)COOCH_2CH_2—$ and $Y—R_2—S—R_2—$ or $—R_2—S—(R_2Z)—_mR_2—S—R_2—$ (however, $R_2$ indicates alkylene group, while Z oxygen atom or sulfur atom. Also, m indicates an integer from 0 to 3)

Formula 5

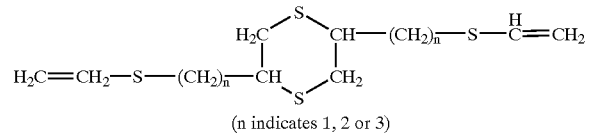

(n indicates 1, 2 or 3)

Formula 6

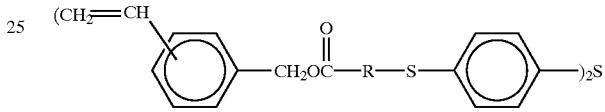

Formula 7

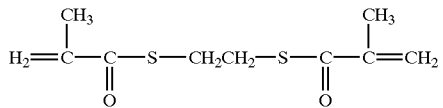

Formula 8

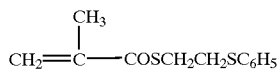

Formula 9

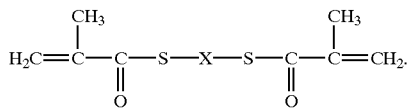

6. A planar micro-lens as defined in claim 4, wherein said low refractive index resin material is any one of resins of fluorine group, resins of acryl group, and resins of epoxy group.

7. A planar micro-lens as defined in claim 4, wherein any one of boundary surfaces between said glass substrate and the high refractive index resin material, between the glass substrate and the low refractive index resin material, and between the high refractive index resin material and the low refractive index resin material, is coupled by means of a coupling agent.

8. A planar micro-lens as defined in claim 7, wherein said coupling agent is γ-glycidepropyl-trimethoxysilane or γ-mercaptpropyl-trimethoxysilane.

9. A planar micro-lens an defined in claim 4, wherein said high refractive index resin material contains a curing agent of thiol group.

10. A planar micro-lens as defined in claim 9, wherein said curing agent of thiol group is pentaerithritol-tetrakisthiopropionate, as indicated by the following equation (formula 10), or trihydroxyethyl-isocyanate β mercaptpropionic acid, as indicated by the following equation (formula 11):

Formula 10

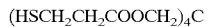

Formula 11

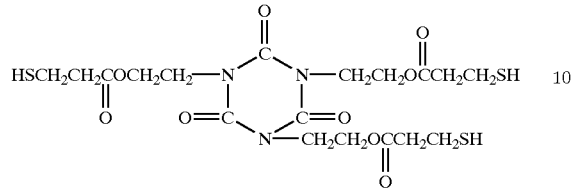

11. A planar micro-lens as defined in claim 9, wherein a curing promotion agent is contained which is other than said curing agent of thiol group.

12. A planar micro-lens as defined in claim 11, wherein said curing promotion agent is dibutyltin-dilaurate, as indicated by the following formula 12:

Formula 12

* * * * *